Nov. 8, 1966    G. W. COPE    3,283,916
AUTOMATIC COUPLER CENTERING DEVICE
Filed July 30, 1965    8 Sheets-Sheet 1
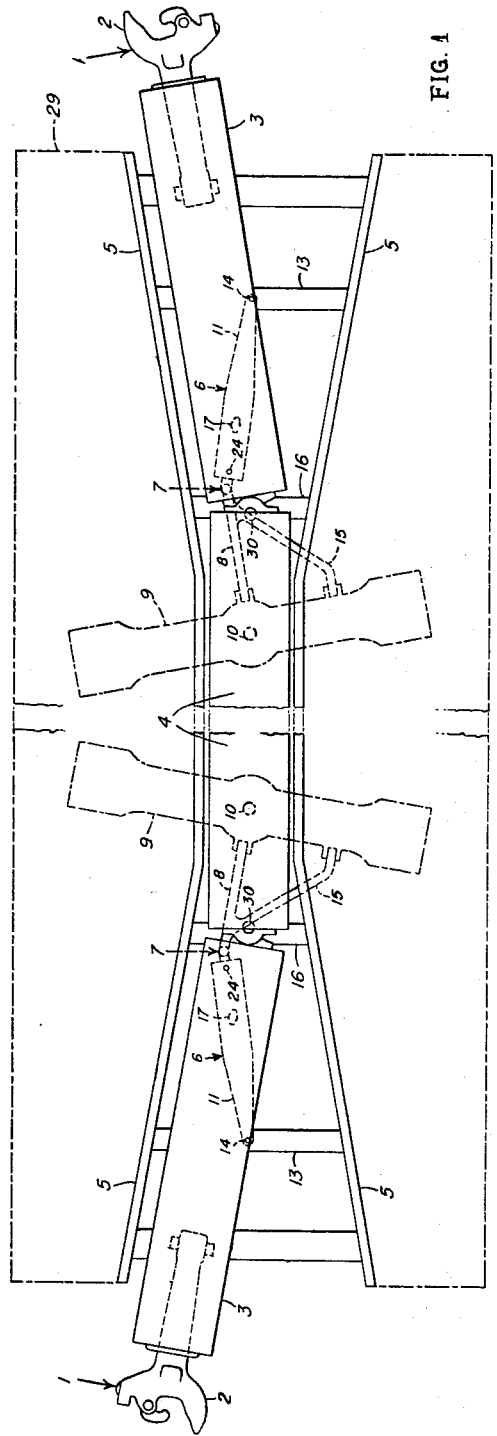
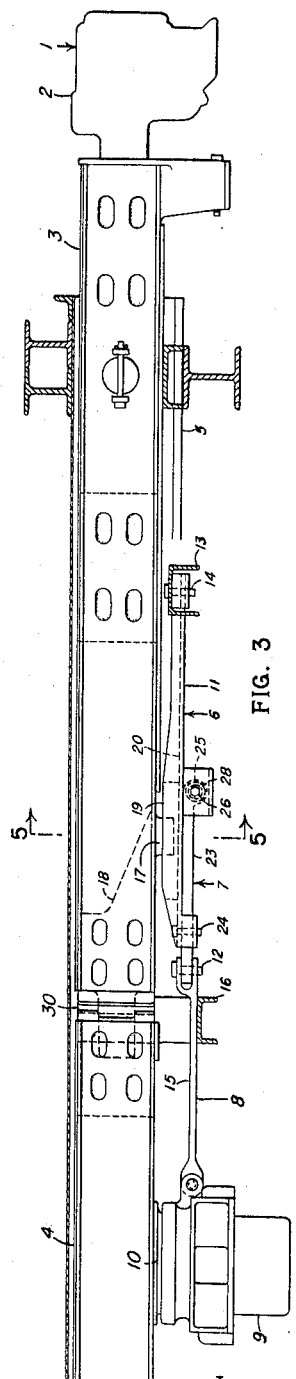
Inventor:
Geoffrey W. Cope
By Wilmer Mechlin
his Attorney

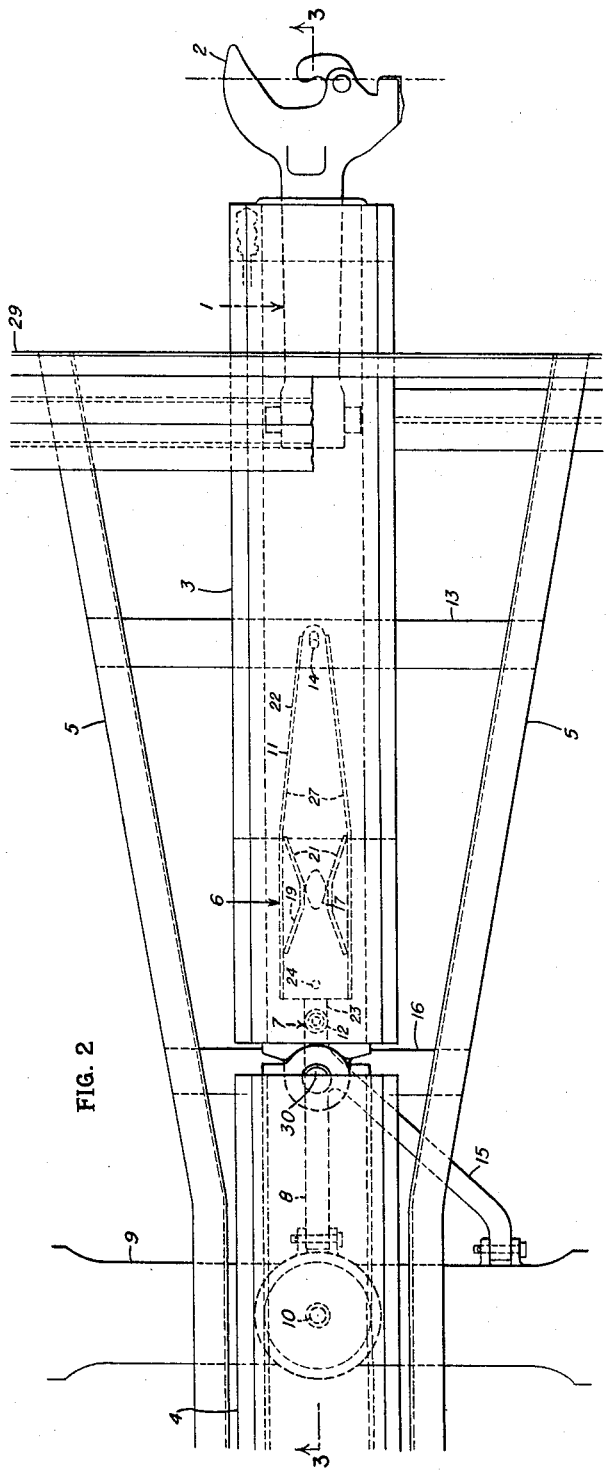
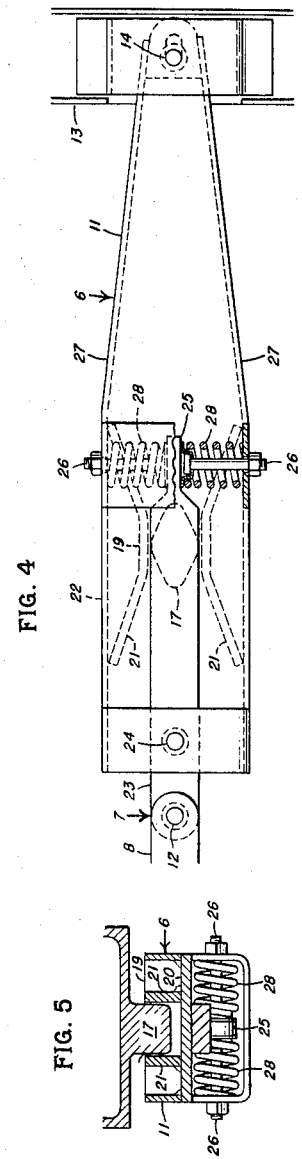
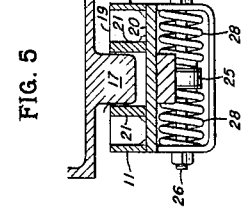
FIG. 2
FIG. 4
FIG. 5
Inventor
Geoffrey W. Cope
By Wilmer Mechlin
his Attorney

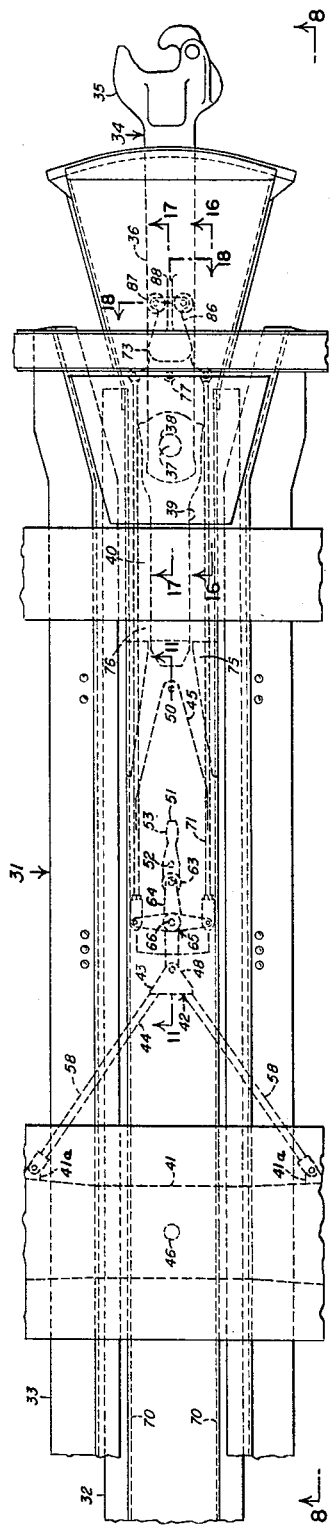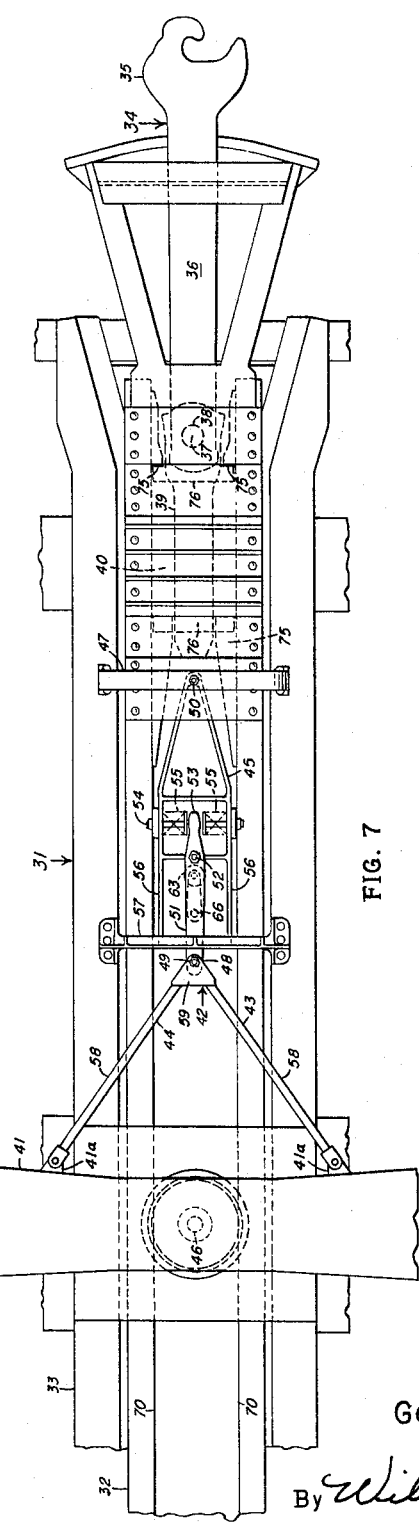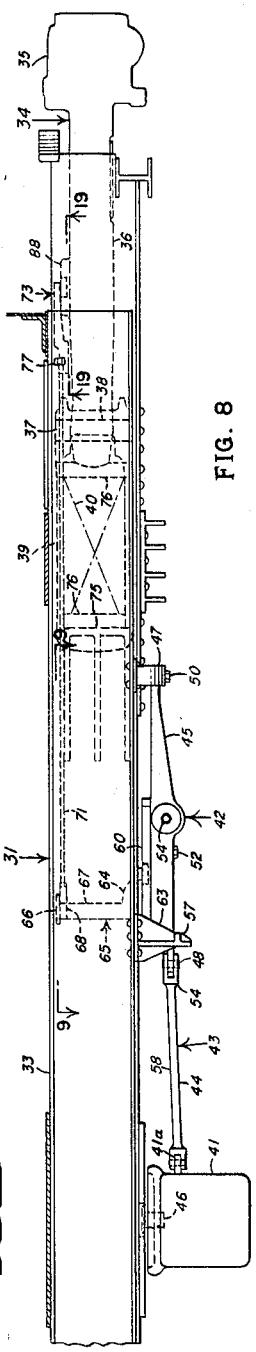

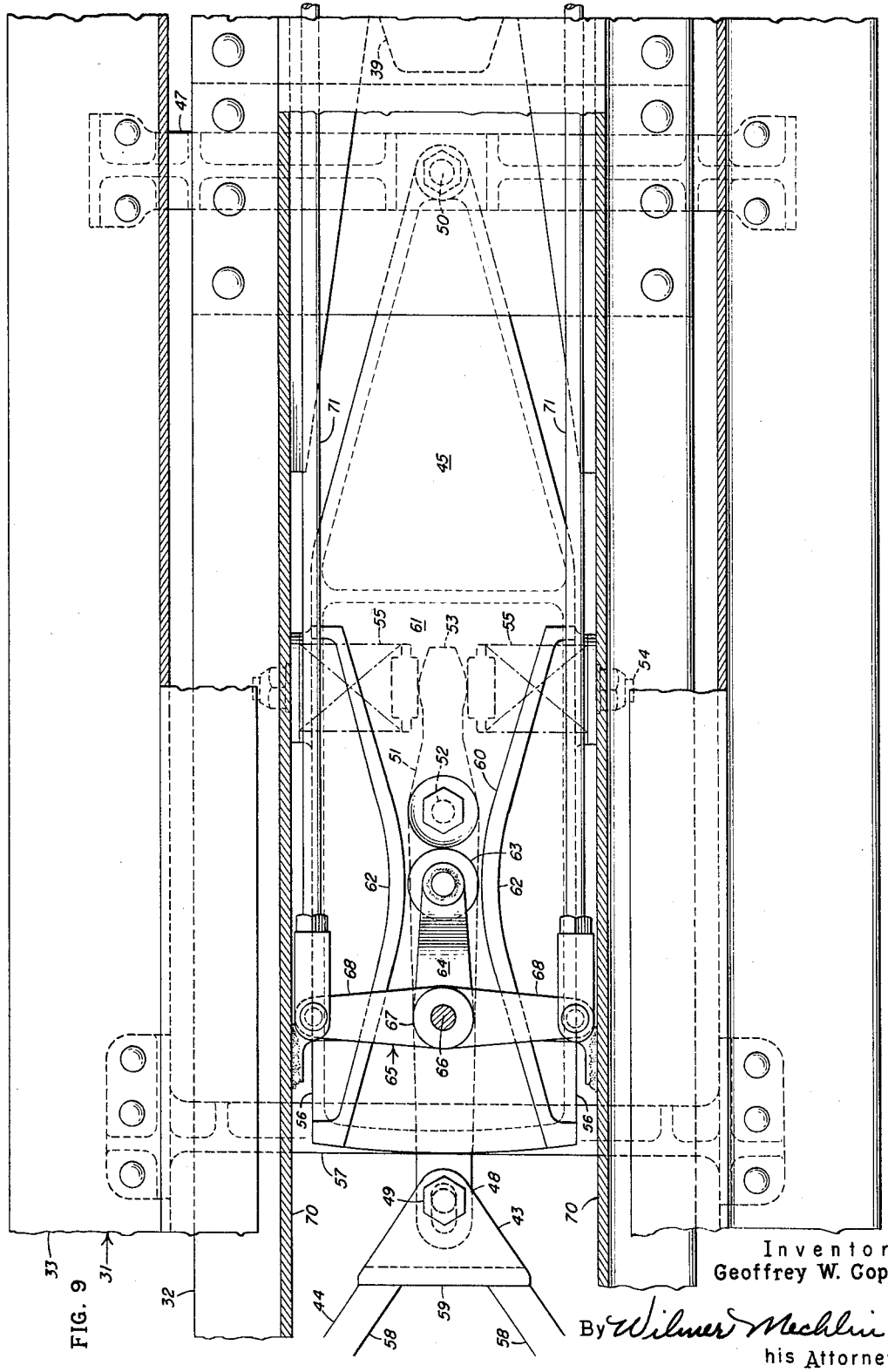

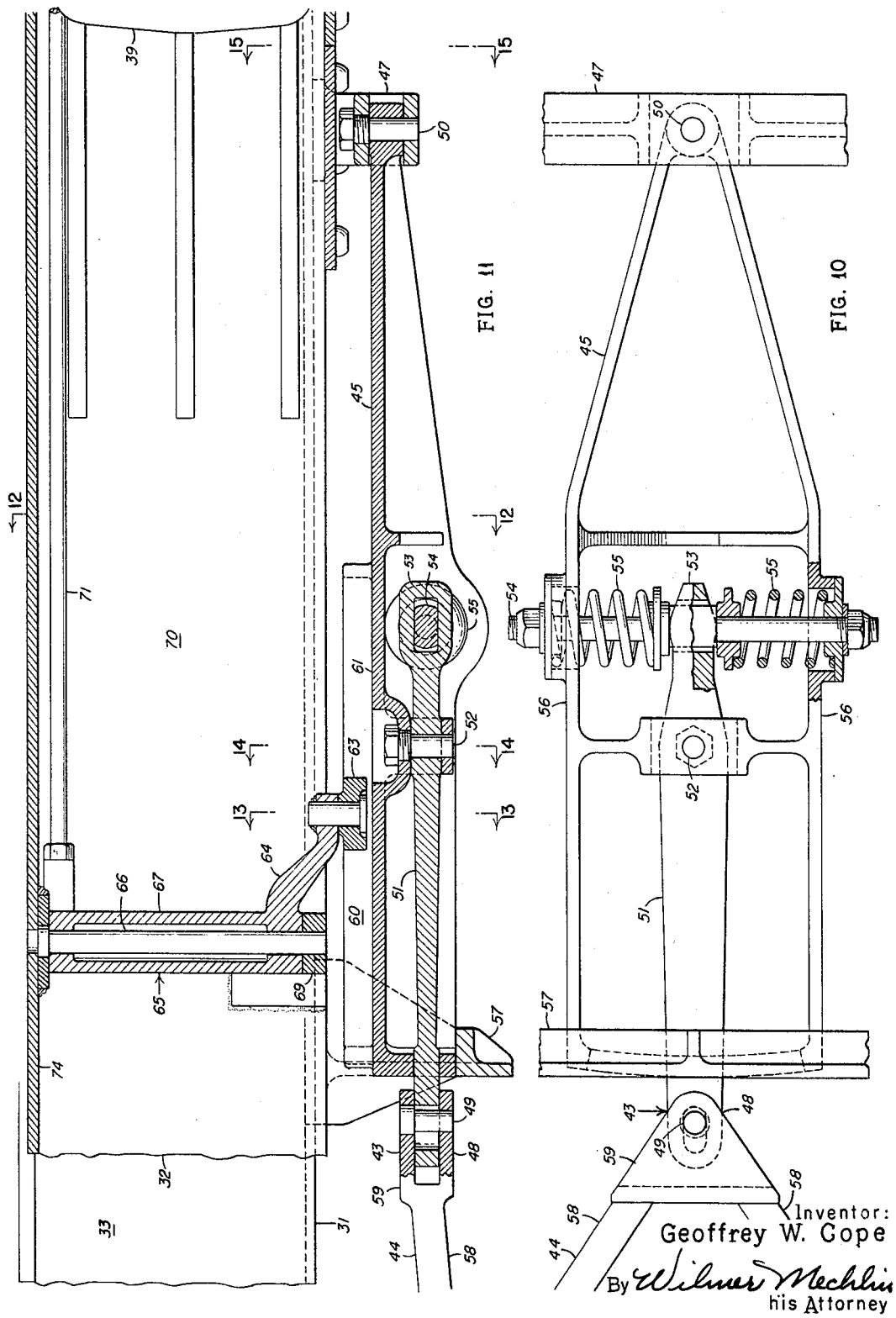

Nov. 8, 1966

G. W. COPE 3,283,916

AUTOMATIC COUPLER CENTERING DEVICE

Filed July 30, 1965

Inventor:
Geoffrey W. Cope
By Wilmer Mecklin
his Attorney

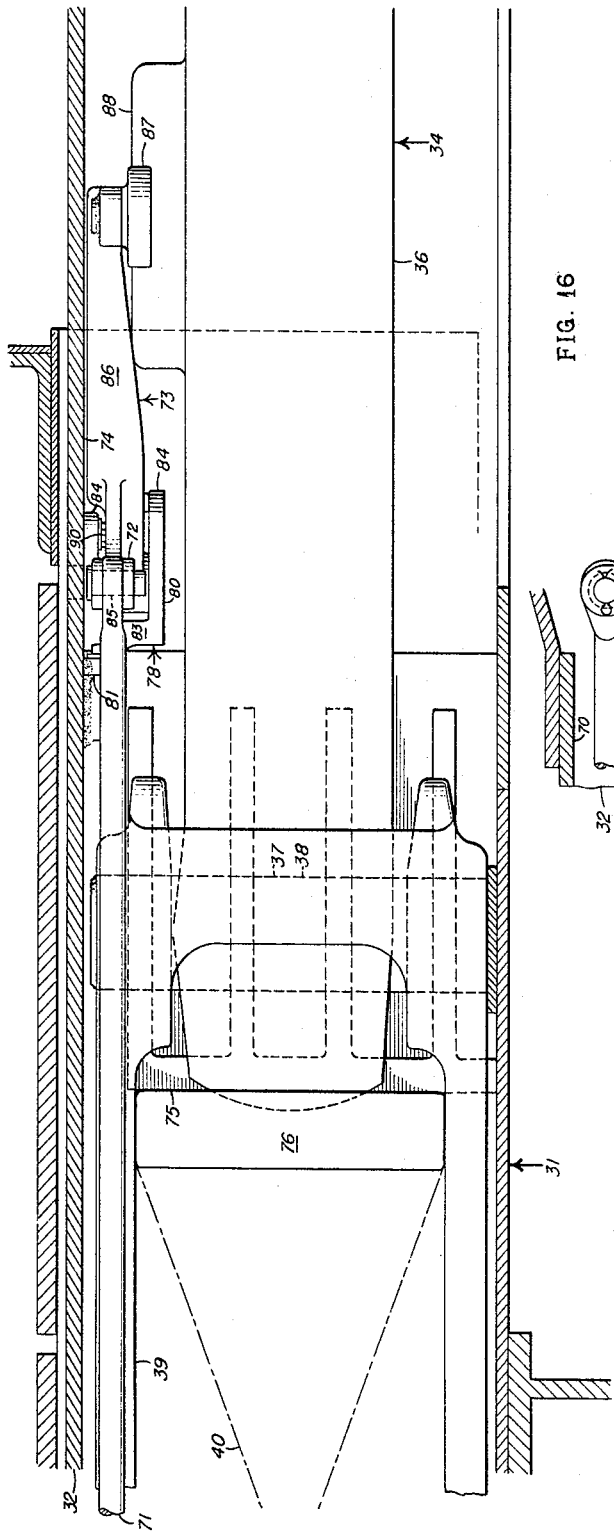

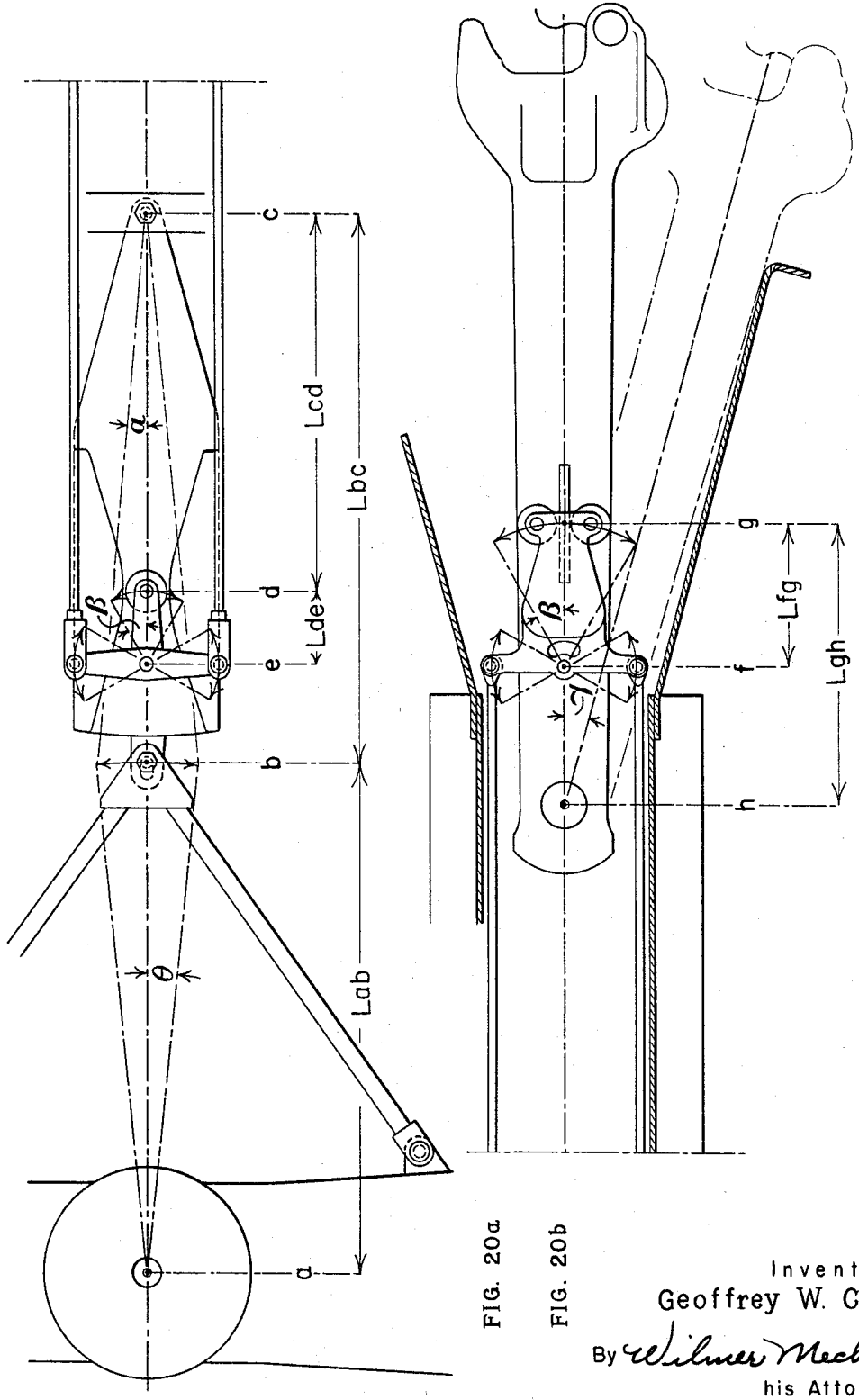

United States Patent Office 3,283,916
Patented Nov. 8, 1966

3,283,916
AUTOMATIC COUPLER CENTERING DEVICE
Geoffrey W. Cope, Williamsville, N.Y., assignor to Symington Wayne Corporation, Salisbury, Md., a corporation of Maryland
Filed July 30, 1965, Ser. No. 475,975
18 Claims. (Cl. 213—15)

This invention relates to automatic centering devices for railway car couplers and this application is a continuation-in-part of my copending application Serial No. 302,668, filed August 16, 1963, now Patent No. 3,211,297.

As pointed out in the above application, the current demands of railroads and shippers for higher capacities is producing freight cars, such as 85 ft. piggyback cars and, very recently, 86½ ft. boxcars, that in length far exceed the maximum of below 55 ft. of a few years ago. With a limit of somewhere around 70 ft. between truck centers imposed for curve negotiability by the curves of present trackage, the additional length of the new long cars has had to be provided by increased overhangs at the ends beyond the truck centers. These long overhangs in turn have required a corresponding increase in the lateral swing or range of movement of the couplers with which such cars are equipped to accommodate the greater offset of the ends relative to the underlying track in negotiating curves when coupled with either long or conventional freight cars. A further complication has been the almost invariable demand for equipping long cars with cushion underframes having travels of upwards of around 20 in.

Aside from the excessive lateral forces to which long cars are subjected, to the elimination of which my copending application is primarily directed, the increased lateral swing of the couplers of long cars presents a problem in coupling that has now reached the critical stage. The gathering range of the heads of present standard couplers will permit freight cars of conventional lengths to couple on either straight or curved track, but cannot possibly accommodate the extended swing required of the couplers on long cars. Consequently, a long car cannot be coupled effectively to another car on either curved or straight track unless the involved couplers of both cars are at that time centered on the underlying track within the gathering range of their heads. Long cars now in service seldom make provision for such centering and in many cases it is not practical to swing the coupler manually to proper position, as when the long car is the moving rather than the standing car. As a result, there has been widespread damage to the end structures of the cars by the passing of the couplers in attempting to couple long cars.

The primary object of the present invention is to provide an improved automatic coupler centering device which is operative, whenever a coupler is uncoupled, automatically to center its head upon the underlying track and thus have it ready at all such times for coupling.

Another object of the invention is to provide an improved automatic coupler centering device which derives its centering action from the angling of an adjoining truck relative to the car and so operatively connects the truck and the coupler as to cause the coupler, when uncoupled, to swing with the truck to the extent required for centering by the overhang of the particular car.

An additional object of the invention is to provide an improved automatic coupler centering device which, while positively controlling the lateral position of a coupler relative to underlying track, whenever it is uncoupled, permits the coupler, when coupled, to swing independently of angling of the truck as necessary to accommodate special track conditions.

A further object of the invention is to provide an automatic coupler centering device which not only is applicable to cars having cushion or fixed underframes but, by requiring a minimum of modification of the structure in which it is incorporated, can be applied to cars now in service as well as to new cars.

Other objects and advantages of the invention will appear hereinafter in the detailed description, be particularly pointed out in the appended claims, and be illustrated in the accompanying drawings, in which:

FIGURE 1 is a somewhat diagrammatic plan view showing the embodiment of the automatic centering device of the present invention disclosed in my copending application and illustrating the action of the device when the car to be coupled is on a curve;

FIGURE 2 is a fragmentary plan view on an enlarged scale of the structure of FIGURE 1, with certain portions removed and others broken away to more clearly illustrate certain of the details of construction;

FIGURE 3 is a side elevational view of the structure of FIGURE 2 with portions broken and shown in section;

FIGURE 4 is a fragmentary bottom plan view, partly in section and on an enlarged scale, showing a part of the centering device;

FIGURE 5 is a fragmentary vertical sectional view on the scale of FIGURE 4, taken along lines 5—5 of FIGURE 3;

FIGURE 6 is a fragmentary plan view of a cushion underframe incorporating a second embodiment of the automatic centering device of this invention;

FIGURE 7 is a bottom plan view of the structure of FIGURE 6;

FIGURE 8 is a vertical sectional view taken along lines 8—8 of FIGURE 6;

FIGURE 9 is a fragmentary horizontal sectional view on an enlarged scale taken along lines 9—9 of FIGURE 8;

FIGURE 10 is a bottom plan view of the structure of FIGURE 9 with portions broken away and removed to more clearly illustrate certain of the details of construction;

FIGURE 11 is a fragmentary vertical sectional view on the scale of FIGURE 10, taken along lines 11—11 of FIGURE 6;

FIGURE 16 is a fragmentary vertical sectional view on the scale of FIGURE 9 taken along lines 16—16 of FIGURE 6;

FIGURE 17 is a fragmentary vertical sectional view on the scale of FIGURE 16 taken along lines 17—17 of FIGURE 6;

FIGURE 18 is a fragmentary vertical sectional view on the scale of FIGURE 16 taken along lines 18—18 of FIGURE 6;

FIGURE 19 is a fragmentary horizontal sectional view on the scale of FIGURE 16 taken along lines 19—19 of FIGURE 8; and FIGURES 20a and 20b are together a somewhat diagrammatic view of the centering device of FIGURE 6 on an enlarged scale.

Figure 12:
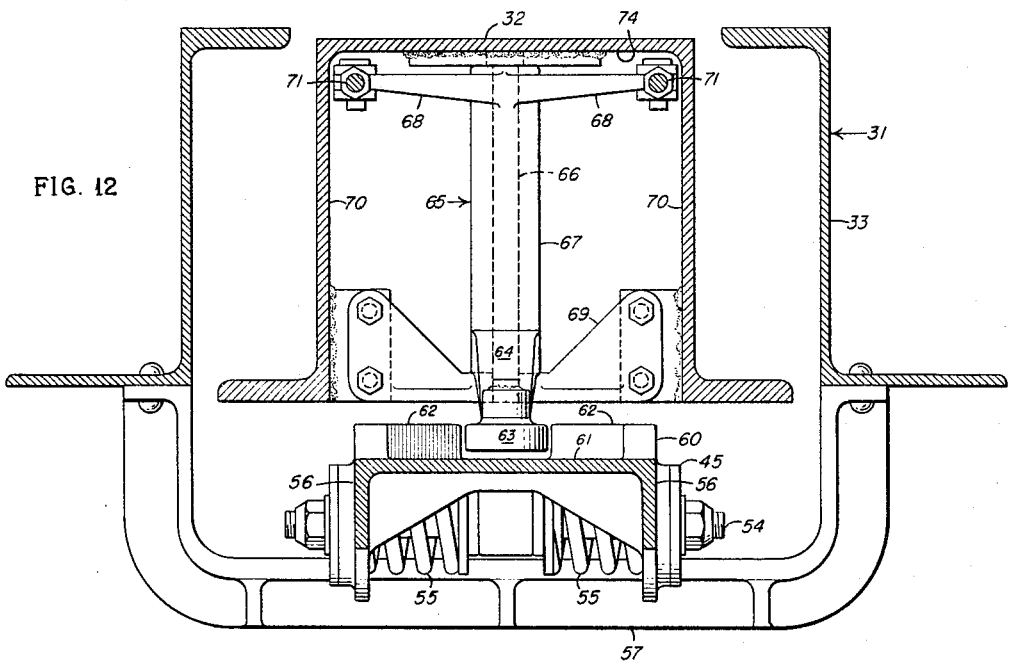
FIGURE 12 is a vertical sectional view taken along lines 12—12 of FIGURE 11.

Referring now in detail to the drawings in which like reference characters designate like parts, the improved automatic centering device of the present invention, while applicable to other railway cars, is particularly designed for use on long freight cars which, due to the extended lateral swing of their couplers, require centering of the couplers on underlying track for effective coupling. The centering need not be exact on long cars any more than on conventional cars, it sufficing for automatic coupling in either case that the contact between the mating couplers be within the gathering range of their heads and it is in the sense of such required centering rather than exact centering that the term "centering" is used herein.

The problem with which this invention is primarily concerned is to automatically position a coupler of a long overhang car for automatic coupling without interfering with movement of the coupler when it is coupled. In solving this problem it was recognized that, while for automatic coupling, a coupler had to be centered on the underlying track at the time of first contact with the mating coupler, it could be so centered whenever it was uncoupled but, when coupled, would have to be able to swing off center with the mated coupler to accommodate special service conditions, such as the negotiation of reverse curves. It was further recognized that, in following the curvature of the track, the trucks of the car, in pivoting or angling relative to the body, would have their bolsters normal or at right angles to the centerline of the track on straight track and to a tangent to the centerline on curves. Deriving the centering force from angling of an adjoining truck bolster relative to the body, the automatic centering device of this invention automatically centers an uncoupled coupler on the underlying track in position for automatic coupling without preventing the coupler from moving as necessary when it is coupled, and, when applied to a car having a cushion underframe, is not rendered inoperative by the extended longitudinal movements of which the floating sill is capable.

As exemplary of the invention, two embodiments have been illustrated, one that disclosed in my copending application Serial No. 302,668, and the other an adaptation of basically the same mechanism to a cushion underframe car in which the couplers are connected for horizontal swinging to the floating sill. Considering first the embodiment disclosed in my copending application and illustrated herein in FIGS. 1–5, as explained at length in that application, the coupler 1, while having a head 2 of a Type F coupler, is mounted for only vertical swinging in a draft arm 3. In turn, the draft arm 3 is connected for horizontal swinging to a sill 4 which, depending on the installation, may either be fixed or, as illustrated, a floating or sliding sill of a cushion underframe which is adapted to slide longitudinally in a fixed center sill 5.

Acting through the draft arm 3 in centering the coupler 1 on underlying track, the automatic centering device or mechanism of this embodiment, designated as 6, includes a jointed or compound lever 7, one or a rear or inner arm 8 of which is connected at the rear to and swingable horizontally with the bolster 9 of the adjoining truck (not otherwise shown) and projects forwardly from the bolster substantially normal or at right angles to the latter's longitudinal centerline, radially of the pivot 10 of the truck. The other, front or outer arm 11 of the jointed lever 7 is connected at the rear for relative horizontal swinging to the rear arm 8 by the joint 12 and at the front along the longitudinal centerline of the car to a cross-brace or strap 13 fixed to and extending between the sides of the fixed sill 5 below the draft arm 3. There is a pin-and-slot connection 14 either in the joint 12 or, as illustrated, between the front arm 11 and the cross-brace 13 to accommodate changes in the length of the lever 7 as it breaks at the joint. The rear arm 8 preferably is provided with an integral side or angle brace 15 to prevent bending and both the brace and the arm preferably are connected to the bolster 9 for vertical swinging relative thereto about a common horizontal axis parallel to the bolster's centerline. To relieve the joint or hinge 12 of the weight of the lever 7, the latter preferably is slidably supported adjacent the joint on a cross-bearer or support 16 fixed to and extending across the center sill 5 and here underlying both the rear arm 8 and the floating sill 4.

For transmitting the angling of the rear arm 8 with the bolster 9 and resultant angling of the front arm 11 relative to the centerline of the car, to the draft arm 3, there is provided on the underside of the draft arm a depending, positioning lug 17, itself positioned centrally, laterally or transversely of the draft arm, and fixed thereto, conveniently by forming it integrally with a butt casting 18 in the rear of the draft arm. In the neutral position of the floating sill 4 in which it is normally held by the resilient means (not shown) connecting it to the fixed sill 5, the positioning or locating lug 17 projects or extends downwardly into a guideway or guide track or slot 19 on or in and extending longitudinally of the top or upper side 20 of the front arm 11 of the jointed lever 7. If, in a particular installation, there is no floating sill to contend with, the guideway 19 may be parallel-sided and of a width to slidably receive or accommodate the positioning lug 17. However, in a floating or cushion/underframe installation, such as that illustrated, the guideway 19 preferably is open-ended and its sides 21, while parallel over its central portion in which the lug 17 normally is received, flair or diverge toward either end, thus enabling the lug to move out and be displaced laterally relative to the centerline of the guideway at the extremes of longitudinal movement of the floating sill and still be guided or gathered back into normal position substantially at the longitudinal center of the guideway on return of the sill to neutral position. For the same reason, it is preferred that the positioning lug 17 be substantially diamond-shaped in cross-section and tapered toward either end.

To accommodate special conditions in which the coupler 1 and bolster 9 are required to swing laterally independently of each other, as when the car is either traversing a reverse curve with the coupler coupled or being push-poled or chain-hauled around a tight curve in an industrial yard with the coupler against a stop, the centering device 6 is made yieldable so as not to interfere with or be overstressed by such swinging. To this end, the front arm 11, instead of being rigid, is itself a jointed member formed of a main part or front arm 22 carrying or mounting the guideway 19 and pivotally connected at the front to the cross-bearer 13 and an equalizer bar or intermediate part, link or arm 23 pivotally connected at the rear to the rear arm 8 and also having a pivotal connection 24 intermediate its ends to the rear end portion of the main part. Thus pivotable horizontally relative to the main part 22, the equalizer bar 23 is yieldably resisted in such movement, suitably by forming on the bar at the front and forwardly of the positioning lug 17, a tongue 25 projecting between bolts 26 extending laterally or transversely through and anchored to opposite sides 27 of the main part and mounting on opposite sides of the tongue a pair of coil or like equalizer springs 28 acting between the sides and the tongue and normally holding the latter centered relative to the main part.

With the automatic centering device 6 constructed in the above manner, any angling of the bolster 9 relative to the centerline of the car 29 will angle or swing both arms 8 and 11 of the jointed lever 7 away from the centerline toward one side of the car and, by the sliding connection between the front arm and the draft arm 3 provided by the guideway 19 and positioning lug 17, cause the draft arm to angle or swing laterally toward the same side of the car. The angle or arc through which the draft arm 3 will swing in response to angling of the bolster 9 is determined or controlled by the lengths of the several moment or lever arms of the leverage acting on the draft arm. Thus, designating the moment arm from the truck or bolster pivot 10 to the joint 12 of the jointed lever 7 as "A," that from the joint 12 to the front pivot of the lever where it is connected by the pin-and-slot connection 14 to the cross-brace 13 as "B," the moment arm from the pivot 30 of the draft arm 4 to the positioning lug 17 as "C," and the remaining arm from the positioning lug to the front pivot of the lever as "D" and disregarding the slight variations in the lengths of the arms over the range of angling of the lever, if $A/B = C/D$, the angularity of the draft arm at any time relative to the centerline of the car will be the same as that of the bolster. While this equality need not obtain and will not center the head 2 of the coupler 1 under all conditions exactly on the track being negotiated, the centering device 6 does position a coupler head relative to the center of the track rather than relative to the centerline of the car and, by judicious selection of the moment arms, enables the head of an uncoupled coupler to be positioned at all times sufficiently close to the track center to be within the gathering range of the head. With the centering device, there, therefore, is no problem in automatic coupling raised by the shifting of the horizontal pivot of the coupler 1 rearwardly toward the truck pivot 10.

Figure 13:
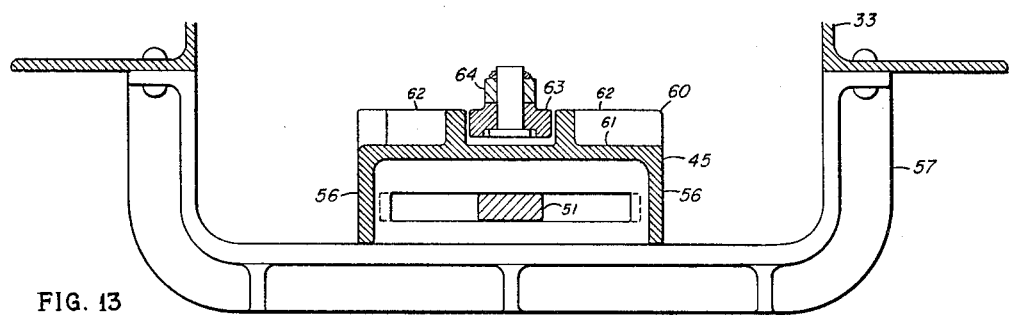
FIGURE 13 is a fragmentary vertical sectional view taken along lines 13—13 of FIGURE 11.
Figure 14:
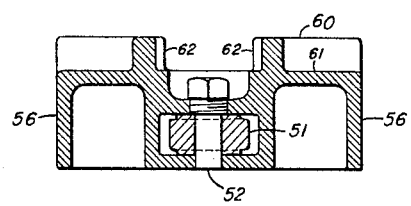
FIGURE 14 is a fragmentary vertical sectional view taken along lines 14—14 of FIGURE 11.
Figure 15:
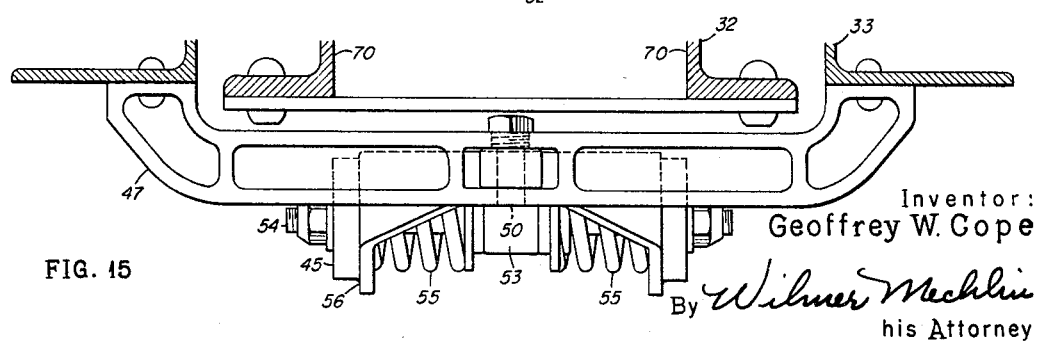
FIGURE 15 is a fragmentary vertical sectional view on the scale of FIGURE 9 taken along lines 15—15 of FIGURE 11.

In the second embodiment of FIGURES 6-20, the problem of automatically centering a coupler for coupling is presented by a long car having a long overhang and equipped with a cushion underframe 31, which, conventionally and as opposed to the first embodiment, has a floating or sliding sill 32 extending the length of the car and projecting beyond the fixed center sill 33 in which it is slidably mounted. In this case the coupler 34 has a Type E head 35 and an extra long shank 36. Mounted in the end of the floating sill 32, the coupler 34 is connected thereto for relative horizontal swinging about a vertical pivot 37. As in most cushion underframes, the connection is made by a pivot pin 38 to a yoke 39 which embraces a draft gear or other suitable cushioning unit 40 for permitting limited cushioned longitudinal movement of the coupler relative to the floating sill in both buff and draft.

Deriving its centering force from the adjoining truck bolster 41 but required to transmit that force substantially the full length of the overhang, the centering device or mechanism 42 of this embodiment does so by a series or train of levers and links. At the bolster end the centering device 42 has a jointed or compound lever 43 which in its construction and operation is substantially the same as the jointed lever 7 of the first embodiment. Thus, the jointed lever 43 projects forwardly from the bolster 41 and has a rear arm 44 and a front arm 45, the former connected at the rear to the bolster for horizontal swinging or angling in unison therewith about a truck pivot 46 and the latter pivoted or fulcrummed at the front to a cross-brace 47 fixed to or rigid with and extending across the fixed center sill 33 below the floating sill 32. The rear arm 44 at the front and front arm 45 at the rear are pivotally connected or hinged for relative horizontal swinging or angling at a joint or hinge 48, with a pin-and-slot connection 49 to permit the swinging in this case at the joint rather than at the pivot 50 of the front arm 45 on the cross-brace 47.

As in the first embodiment, the rear and front arms 44 and 45 are yieldably instead of directly connected, the connection being made by an equalizer bar or intermediate or connecting arm 51 which is carried by and, when the coupler 34 is coupled, moves with and forms part of the front arm, but, by being able to angle horizontally against yieldable resistance relative to the front arm, permits the coupler to angle independently of the bolster. To perform its intended function, the intermediate arm 51 is connected at the rear to the rear arm 44 by the joint 48 and intermediate its ends to the front arm 45 for relative horizontal pivoting about a pivot 52. Forwardly of the latter pivot, the intermediate arm 51 has a tongue 53 which is apertured to receive a bolt 54 attached to and extending laterally of or across the front arm 45 and carrying at each side of the tongue a coil or like suitable equalizer or relief spring 55. Reacting between the tongue 53 and an adjoining side 56 of the front arm 45, each of the relief springs 55 is of a stiffness to avoid compression under the forces required for centering the coupler 34 for coupling but to be compressible or yieldable under the much higher forces developable on swinging of the coupler with a mated coupler.

Substantially the same in the above respects as the jointed lever 7 of the first embodiment, the jointed lever 43 of the second embodiment also is supported intermediate its ends by a cross-bearer 57 extending below it across and fixed to the center sill 33 on which the front arm 45 is adapted to slide. The main difference between the jointed levers of the two embodiments is in their rear arms. In this embodiment, the preferred rear arm 44 is of V-shape and formed by a pair of rearwardly divergent rods 58 joined at the front by a header or gusset plate 59 and clevised at the rear for connection to brackets 41a fixed to or rigid with the adjoining side of the bolster 41 at opposite sides of and equidistance from the truck pivot 46, the rods and the included part of the bolster thus in effect forming the sides of a truss.

With the joint 48 and pivots 50 and 52 centered laterally on the center sill 33 and thus on the car's longitudinal centerline when the bolster 41 is normal or at right angles thereto, but with only the pivot 50 so centered on swinging of the bolster toward one side or another as the truck of which it is a part follows a curve in the track, the jointed lever 43 transmits the angling of the bolster to the coupler 34 through a guideway or slot 60 on or in and extending longitudinally of the upper or top surface or side 61 of the front arm 45. Since for use on a cushion underframe car, the guideway 60 conforms in configuration to the guideway 19 of the first embodiment, which, as illustrated, is designed for use on such a car. Centered laterally on the front arm 45, the guideway 60 has its spaced sides 62 substantially parallel over its central portion but flared or divergent toward either end.

In this embodiment, the depending element normally riding or received in the guideway 60 and guided back thereinto by the outward divergence of the sides 62 after extended longitudinal movements of the floating sill 32, preferably is a guide roller 63 mounted on and suspended from the outer end of a lower arm 64 of a multi-armed intermediate lever 65 which is mounted in the floating sill 32 above the jointed lever 43 for horizontal swinging or pivoting about a vertical pivot fixed by a vertical pivot pin 66 centered laterally on the floating sill. Conveniently having as its hub 67 a tube or sleeve turning on the pin 66 and with the lower arm 64 integral or rigid with and projecting forwardly from the sleeve, the intermediate lever 65 has as its other arms a pair of radial arms 68 which conveniently are integral or rigid with and outstand from opposite sides of the upper end of the hub 67 and preferably are at right angles to and have the same radial length or moment arm as the lower arm 64. The pivot pin 66 is centered at the bottom and both it and the intermediate lever 65 are supported by a cross-plate 69 bolted or otherwise releasably attached to the side walls 70 of the floating sill 32.

The preferred equality in radius or coradiality of the lower arm 64 and upper arms 68 of the intermediate lever 65, ensures that each arm will swing through the same angle and its outer end or extremity will swing through the same arc or move the same distance in response to horizontal angling of the jointed lever 43 relative to the floating sill 32. To make maximum use of the space within the floating sill 32, the upper or side arms 68 preferably extend substantially to the sill's side walls 70. A pair of links 71 connected to the outer ends of the arms 68 and extending forwardly therefrom connect them to preferably correspondingly disposed and coradial side arms 72 of a front multi-armed lever 73 which is mounted in the floating sill 32 above the shank 36 and forwardly of the pivot 37 of the coupler 34. Preferably adjustable in length to compensate for manufacturing and installation tolerances, the links 71 should be positioned not only adjacent the side walls 70 of the floating sill 32, but as close as possible to its top wall 74 to avoid interference with the coupler 34 and structure connecting it to the sill. Even with the links or connecting rods 71 so disposed, their clearance may require some notching or recessing of the front and rear stop lugs 75 fixed to the side wall 70 of the floating sill 32 for receiving the forces transmitted through the cushioning unit 40 and for certain types of cushioning units any follower blocks 76 may also have to be notched. To intrude as little as possible upon the space in the floating sill 32 above the coupler shank 36 without unduly complicating installation, the front lever 73, which has its pivot 77 centered laterally on the floating sill, is mounted on the sill's top wall 74 by a mounting bracket 78 having one part 79 welded or otherwise fixed to the wall and another part 80 bolted or otherwise removably attached to the fixed part and directly mounting the lever. For adequate bearing, the fixed part 79 preferably is U-shaped in plan and has a central web 81, to the front of which the removable part 80 is bolted. In turn, the removable part 80 is T-shaped with its head 82 bolted to the web 81 and a bifurcated stem projecting forwardly therefrom and mounting between its upper and lower jaws 84 a pivot pin 85 on which the front lever 73 pivots.

With its side arms 72 at its rear and subsantially aligned laterally with the pivot pin 85, the front lever 73 has a front arm 86 which projects forwardly from its pivot 77 at right angles or normal to the side arms and carries at the front a pair of laterally spaced rollers or other suitable force transmitting elements 87 disposed on and engageable with opposite sides of and laterally embracing or straddling a rib 88 upstanding from and centered laterally on and extending longitudinally of the shank 36 of the coupler 34. To aid in supporting the removable part or member 80 and, therethrough, the front lever 73, the upper jaw 84 of that member is secured at the front to the sill top wall 74 ahead of the pivot pin 85 by an anchor bolt 89. Access from below to the anchor bolt 89, as well as room to accommodate the bolt's head 90 over the range of swinging of the front lever 73, is provided by an arcuate aperture 91 in the front arm 86 and an aligned opening 92 in the lower jaw.

Constructed in the above manner, the centering device 42 of the second embodiment, when the coupler 34 is uncoupled, receives the centering force from the adjoining bolster 41 through the rear arm 44 of the jointed lever 43 and transmits that force through the lever's front arm 45 and the guideway 60 thereon to the lower arm 64 of the intermediate lever 65, thence through the upper arms 68 of that lever and the connecting links 71 to the side arms 72 of the front lever 73 and finally to the coupler through the front arm 86 and the rib 88 on the coupler's shank 36.

Since in angling in response to the force transmitted to them from the bolster 41 through the jointed lever 43, the intermediate and front levers 65 and 73 swing or turn about their pivots in the same clockwise or counterclockwise direction as the bolster and the front lever applies the resultant force to the coupler 34 ahead of the latter's pivot 37, the coupler also will swing or turn in the same direction. To make effective use of the angling of the bolster for centering the head 35 of the coupler for coupling on the underlying track thus is simply a matter of calculating or determining the moment arms of the several levers required for the overhang and coupler length of the particular car in the manner hereafter explained. The centering device 42, like that of the first embodiment, while yieldable to accommodate special conditions requiring independent lateral swinging of the coupler 35 and bolster 41, will still tend to center the coupler on underlying track. However, since the relief springs of both embodiments are predetermined to compress under forces of the order generated at the coupler when it swings with a mated coupler or at the bolster with the coupler at a limit of its swing, one or other of the springs 55 will compress under such forces and, by enabling the intermediate arm 51 of the jointed lever 43 to swing relative to the front arm 45, render such relative swinging of the coupler and the bolster independent of the action of the centering device.

Calculation of the moment arms required in the centering device 42 for a particular installation, is simplified, if as illustrated, the arms 64 and 68 of the intermediate lever 65 and the side arms 72 of the front lever 73 are all coradial, since the lower arm of the intermediate lever and the front arm 86 of the front lever will always pivot or swing through the same angle. The calculations also are aided by the relatively small angles involved as the bolster 41 swings or rotates toward one side or another from the centerline of the car. The angles all being well below 40°, the principle is able to be invoked that the ratio of two angles within that range is substantially equal to the ratio of their sines. On this principle, the ratio of any two moment arms whose extremities as they swing away from the car's centerline move the same distance in a direction perpendicular to that line, have a ratio that is substantially equal to the inverse of the ratio of the angles through which they swing.

For an understanding of the calculations, reference is made to FIGS. 20a and 20b showing the various angles and moment arms involved, the angles designated by Greek letters and the ends of the moment arms by English letters, the latter without regard to the numbering in the detailed description of the structure. The angle $\theta$ of maximum rotation of the bolster 41 and the angle $\gamma$ of maximum swing of the coupler 34 for centering its head on the underlying track are independently fixed by the curvature of the minimum radius curve the particular car is adapted to negotiate. Since the radius of even the minimum curve will be very large relative to the overhang and coupler length of any car and the pivot of the coupler is substantially at the outer end of the overhang, the ratio of $\theta$ to $\gamma$ can be expressed generally by the following equation:

$$\frac{\theta}{\gamma} = \frac{\text{Coupler length}}{\text{Overhang} + \text{coupler length}}$$

Thus, as the overhang approaches zero, the ratio of $\theta$ to $\gamma$ approaches 1, the relation substantially obtaining in the first embodiment where the overhang is practically discounted by the close proximity of the truck pivot to the pivot for horizontal swinging of the coupler.

In view of the equality of the moment arms of the arms 64 and 68 of the intermediate lever 65 and arms 72 of the front lever 73, the only moment arms and angles requiring consideration are the following:

| Member | Moment Arm | Angle |
|---|---|---|
| Rear arm 44 | $L_{ab}$ | $\theta$ |
| Intermediate and front arms 51 and 45 | $L_{bc}$ | $\alpha$ |
| Front arm 45 | $L_{cd}$ | $\alpha$ |
| Lower arm 64 | $L_{de}$ | $\beta$ |
| Front arm 86 | $L_{fg}$ | $\beta$ |
| Coupler 34 | $L_{gh}$ | $\gamma$ |

In terms of the above moment arms the ratio of $\theta$ to $\gamma$, which is fixed by the dimensions of the particular car, is as follows:

$$\frac{\theta}{\gamma} = \frac{L_{bc}}{L_{ab}} \times \frac{L_{de}}{L_{cd}} \times \frac{L_{gh}}{L_{fg}}$$

The foregoing equation is derived as follows:

$$\theta/\alpha = L_{bc}/L_{ab}$$

$$\alpha/\beta = L_{de}/L_{cd}$$

$$\beta/\gamma = L_{gh}/L_{fg}$$

Knowing the ratio $\theta/\gamma$ for any given car, the appropriate moment arms in the various levers of the centering device 42, thus are readily predeterminable.

From the above detailed description it will be apparent that there has been provided an improved automatic centering device by which the couplers of long overhang cars can be centered automatically for coupling without interfering with their movements when they are coupled. It should be understood that the described and disclosed embodiments are merely exemplary of the invention and that all modifications are intended to be included that do not depart from the spirit of the invention and the scope of the appended claims.

Having described my invention, I claim:

1. In draft rigging for a railway car having sill means extending longitudinally thereof and a coupler mounted in said sill means and swingable laterally relative to said car, an automatic coupler centering device comprising compound lever means connected forwardly to means fixed to said car and rearwardly to an adjoining truck bolster for lateral swinging therewith relative to said car, and means operatively connecting said coupler and lever means for causing said coupler when uncoupled to swing laterally with said lever means in response to said relative lateral swinging of said bolster.

2. In draft rigging for a railway car having sill means extending longitudinally thereof, a coupler connected to said sill means and swingable laterally relative to said car and a truck bolster connected for relative horizontal swinging to said car rearwardly of an adjoining end of said sill means, an automatic coupler centering device comprising compound lever means connected forwardly to fixed means on said car and rearwardly to said bolster, said lever means being operatively connected to said coupler for causing said coupler when uncoupled to swing laterally relative to said car in response to said lateral swinging of said bolster.

3. In draft rigging for a railway car having a floating sill extending and shiftable longitudinally of said car, a coupler mounted in an end of said sill and movable longitudinally therewith and swingable laterally relative to said car and a truck bolster connected for relative horizontal swinging to said car rearwardly of said end of said sill, an automatic coupler centering device comprising compound lever means connected forwardly fixed to said car and rearwardly to said bolster for lateral swinging therewith relative to said car, and means operatively connecting said coupler and lever means for causing said coupler when uncoupled to swing laterally therewith in response to said lateral swinging of said bolster.

4. In draft rigging for a railway car having a floating sill extending and shiftable longitudinally of said car, a coupler mounted in an end of said sill and movable longitudinally therewith and swingable laterally relative to said car and a truck bolster connected for relative horizontal swinging to said car rearwardly of said end of said sill, an automatic coupler centering device comprising a compound lever disposed below said sill, said lever having pivotally connected front and rear arms respectively pivotally connected forwardly to fixed means on said car and rearwardly to said bolster for lateral swinging therewith, and means carried by said sill and swingable laterally with said coupler, said carried means being connected to said lever means for causing said coupler when uncoupled to swing laterally with said bolster.

5. In draft rigging for a railway car having a floating sill extending and shiftable longitudinally of said car, a coupler mounted in an end of said sill and movable longitudinally therewith and swingable laterally relative to said car and a truck bolster connected for relative horizontal swinging to said car rearwardly of said end of said sill, an automatic coupler centering device comprising a compound lever disposed below said sill, said lever having pivotally connected front and rear arms respectively pivotally connected forwardly to fixed means on said car and rearwardly to said bolster for lateral swinging therewith, means carried by said sill and swingable laterally with said coupler, said carried means being connected to said lever means for causing said coupler when uncoupled to swing laterally with said bolster, and yieldable means between said carried means and bolster for enabling said coupler when coupled to swing laterally independent of lateral swinging of said bolster.

6. In draft rigging for a railway car having a floating sill extending and shiftable longitudinally of said car, a coupler mounted in an end of said sill and movable longitudinally therewith and swingable laterally relative to said car and a truck bolster connected for relative horizontal swinging to said car rearwardly of said end of said sill, an automatic coupler centering device comprising a compound lever disposed below said sill, said lever having pivotally connected front and rear arms respectively pivotally connected forwardly to fixed means on said car and rearwardly to said bolster for lateral swinging therewith, means carried by said sill and swingable laterally with said coupler, said carried means being connected to said front arm for causing said coupler when uncoupled to swing laterally with said bolster, and yieldable means in the connection between said arms for enabling said coupler when coupled to swing laterally independent of lateral swinging of said bolster.

7. In draft rigging for a railway car having a floating sill extending and shiftable longitudinally of said car, a coupler mounted in an end of said sill and movable longitudinally therewith and swingable laterally relative to said car and a truck bolster connected for relative horizontal swinging to said car rearwardly of said end of said sill, an automatic coupler centering device comprising a compound lever disposed below said sill and extending forwardly from said bolster, said lever having a rear arm connected rearwardly to said bolster for horizontal swinging therewith relative to said car and a front arm pivotally connected rearwardly to said rear arm and forwardly to fixed means on said car, a guideway on an upper side of said front arm, and means carried by said sill and connected to said coupler for lateral swinging therewith, said carried means including means depending from said sill and slidably received in said guideway for enabling swinging of said bolster in either direction relative to said car to effect a predetermined lateral swinging of said coupler.

8. In draft rigging for a railway car having a floating sill extending and shiftable longitudinally of said car, a coupler mounted in an end of said sill and movable longitudinally therewith and swingable laterally relative to said car and a truck bolster connected for relative horizontal swinging to said car rearwardly of said end of said sill, an automatic coupler centering device comprising a compound lever disposed below said draft arm and extending forwardly from said bolster, said lever having a rear arm connected rearwardly to said bolster and projecting forwardly therefrom substantially radially of a pivot and normal to a longitudinal centerline thereof for horizontal swinging therewith relative to said car, a front arm at the front laterally centered on and connected for relative horizontal swinging to said car, an equalizer bar pivotally connected at the rear to said rear arm and intermediate its ends to said front arm for horizontal swinging relative thereto, resilient means on said front arm and acting upon a front end of said equalizer bar for yieldably resisting horizontal swinging thereof relative to said front arm, an open-ended guideway extending longitudinally and on an upper side of said front arm and having flared end portions, and positioning means carried by and depending from said sill and connected to said coupler for horizontal swinging therewith, said positioning means normally being slidably received in said guideway intermediate said end portions thereof for enabling swinging of said bolster in either direction relative to said car with said coupler uncoupled to effect a predetermined swinging of said coupler in the same direction, and said resilient means enabling said coupler when coupled to swing laterally independent of lateral swinging of said bolster.

9. In draft rigging for a railway car having sill means extending longitudinally thereof, a coupler, and a draft arm carrying said coupler and connected forwardly thereto for relative vertical swinging and rearwardly to said sill means for horizontal swinging in unison with said coupler, an automatic coupler centering device comprising a compound lever pivotally connected forwardly to means fixed to said car and rearwardly to an adjoining truck bolster for horizontal swinging therewith relative to said car, and means fixed to said draft arm and engaging said compound lever for causing said coupler when uncoupled to swing horizontally with said lever in response to said relative horizontal swinging of said bolster.

10. In draft rigging for a railway car having a sill member extending and shiftable longitudinally of said car, a draft arm connected for relative horizontal swinging to an end of and forming with said member a jointed floating sill, and a coupler mounted in said draft arm for horizontal swinging therewith, an automatic coupler centering device comprising a compound lever having pivotally connected front and rear arms respectively pivotally connected at the front to means fixed to said car and connected at the rear to a truck bolster for horizontal swinging therewith relative to said car, guide means on said front arm, and means on said draft arm and slidably received in said guide means for causing said coupler when uncoupled to swing horizontally with said compound lever in response to said horizontal swinging of said bolster.

11. In draft rigging for a railway car having a sill member extending and shiftable longitudinally of said car, a draft arm connected for relative horizontal swinging to an end of and forming with said member a jointed floating sill, and a coupler mounted in said draft arm for horizontal swinging therewith, an automatic coupler centering device comprising a compound lever having pivotally connected front and rear arms respectively pivotally connected at the front to means fixed to said car and connected at the rear to a truck bolster for horizontal swinging therewith relative to said car, guide means on said front arm, and means on said draft arm and slidably received in said guide means for causing said coupler when uncoupled to swing horizontally with said compound lever in response to said horizontal swinging of said bolster, said compound lever including yieldable means for enabling said coupler when uncoupled to swing horizontally independently of said horizontal swinging of said bolster.

12. In draft rigging for a railway car having a floating sill extending and shiftable longitudinally of said car, a coupler mounted in an end of said sill and movable longitudinally therewith and swingable horizontally relative thereto and a truck bolster connected for relative horizontal swinging to said car rearwardly of said end of said sill, an automatic coupler centering device comprising lever means connected to and projecting forwardly of said bolster for horizontal swinging in unison therewith, lever and link means in said sill and connected to said coupler for horizontal swinging therewith, and means connecting said lever means and said link and lever means for causing said coupler when uncoupled to swing horizontally in response to said horizontal swinging of said bolster.

13. In draft rigging for a railway car having a floating sill extending and shiftable longitudinally of said car, a coupler mounted in an end of said sill and movable longitudinally therewith and swingable horizontally relative thereto and a truck bolster connected for relative horizontal swinging to said car rearwardly of said end of said sill, an automatic coupler centering device comprising lever means connected to and projecting forwardly of said bolster for horizontal swinging in unison therewith, lever and link means in said sill and connected to said coupler for horizontal swinging therewith, and means connecting said lever means and said lever and link means for causing said coupler when uncoupled to swing horizontally in response to said horizontal swinging of said bolster, said lever means including means yieldable under forces applied from said coupler for enabling said coupled coupler to swing horizontally independently of said horizontal swinging of said bolster.

14. In draft rigging for a railway car having a floating sill extending and shiftable longitudinally of said car, a coupler mounted in an end of said sill and movable longitudinally therewith and swingable horizontally relative thereto and a truck bolster connected for relative horizontal swinging to said car rearwardly of said end of said sill, an automatic coupler centering device comprising lever means connected to and projecting forwardly of said bolster for horizontal swinging in unison therewith, lever and link means in said sill and connected to said coupler for horizontal swinging therewith, and means connecting said lever means and said link and lever means for causing said coupler when uncoupled to swing horizontally in response to said horizontal swinging of said bolster, said lever means including means yieldable under forces from said coupler when coupled and not otherwise for enabling said coupled coupler to swing horizontally independently of said horizontal swinging of said bolster.

15. In draft rigging for a railway car having a floating sill extending and shiftable longitudinally of said car, a coupler mounted in an end of said sill and movable longitudinally therewith and swingable horizontally relative thereto and a truck bolster connected for relative horizontal swinging to said car rearwardly of said end of said sill, an automatic coupler centering device comprising a compound lever having pivotally connected front and rear arms respectively pivotally connected to means fixed to said car and connected to said bolster for horizontal swinging in unison therewith, a lever mounted for horizontal swinging in said sill rearward of said coupler, a lever in said sill forward of a pivot of said coupler, said forward lever being link-connected to said rearward lever and connected to said coupler for swinging horizontally with both thereof, and means connecting said front arm and rearward lever and operative when said coupler is uncoupled for causing said uncoupled coupler to swing horizontally in response to said horizontal swinging of said bolster.

16. In draft rigging for a railway car having a floating sill extending and shiftable longitudinally of said car, a coupler mounted in an end of said sill and movable longitudinally therewith and swingable horizontally relative thereto and a truck bolster connected for relative horizontal swinging to said car rearwardly of said end of said sill, an automatic coupler centering device comprising a compound lever having pivotally connected front and rear arms respectively pivotally connected to means fixed to said car and connected to said bolster for horizontal swinging in unison therewith, a lever mounted for horizontal swinging in said sill rearward of said coupler, a lever in said sill forward of a pivot of said coupler, said forward lever being link-connected to said rearward lever and connected to said coupler for swinging horizontally with both thereof, means connecting said front arm and rearward lever and operative when said coupler is uncoupled for causing said uncoupled coupler to swing horizontally in response to said horizontal swinging of said bolster, and means connecting said front and rear arms and yieldable only under forces from said coupler when coupled for enabling said coupled coupler to swing horizontally independently of said bolster.

17. In draft rigging for a railway car having a floating sill extending and shiftable longitudinally of said car, a coupler mounted in an end of said sill and movable longitudinally therewith and swingable horizontally relative thereto and a truck bolster connected for relative horizontal swinging to said car rearwardly of said end of said sill, an automatic coupler centering device comprising a compound lever having a front arm pivotally connected to means fixed to said car and a rear arm connected to said bolster for horizontal swinging in unison therewith, an intermediate arm pivotally connected to and connecting said front and rear arms, spring means acting between said intermediate and front arms for permitting relative horizontal swinging thereof under forces from said coupler when coupled and not otherwise, a horizontally swingable lever mounted in said sill rearward of said coupler, a lever mounted in said sill forwardly of a pivot of said coupler and connected thereto for horizontal swinging therewith, said forward and rearward levers having link-connected coradial arms, and an arm on said rearward lever coradial with said link-connected arms and connected to an arm of said jointed lever for enabling said coupler when uncoupled to swing horizontally in response to said horizontal swinging of said bolster.

18. In draft rigging for a railway car having a floating sill extending and shiftable longitudinally of said car, a coupler mounted in an end of said sill and movable longitudinally therewith and swingable horizontally relative thereto and a truck bolster connected for relative horizontal swinging to said car rearwardly of said end of said sill, an automatic coupler centering device comprising a compound lever having a front arm pivotally connected to means fixed to said car and a rear arm connected to said bolster for horizontal swinging in unison therewith, an intermediate arm pivotally connected to and connecting said front and rear arms, spring means acting between said intermediate and front arms permitting relative horizontal swinging thereof under forces from said coupler when coupled and not otherwise, a horizontally swingable lever mounted in said sill rearwardly of said coupler, a lever mounted in said sill forwardly of a pivot of said coupler and having a forwardly projecting arm, roller means on said last-named arm embracing rib means upstanding from a shank of said coupler for enabling said coupler and forward lever to swing horizontally in unison, arm means on said forward lever and coradial with and link-connected to arm means on said rearward lever for causing said levers to swing horizontally in unison, and a forwardly projecting arm on said rearward lever and normally received in guide means on said front arm for causing said coupler when uncoupled to swing horizontally in response to said horizontal swinging of said bolster.

References Cited by the Examiner

UNITED STATES PATENTS

| 900,025 | 9/1908 | Krakau | 213—15 |
| 947,348 | 1/1910 | Pope | 213—15 |
| 2,107,024 | 2/1938 | Bonanno | 213—74 |
| 3,178,035 | 4/1965 | Peterson | 213—8 |

ARTHUR L. LA POINT, *Primary Examiner.*

B. FAUST, D. E. HOFFMAN, *Assistant Examiners.*